United States Patent [19]

Baumgartner

[11] Patent Number: 4,458,228
[45] Date of Patent: Jul. 3, 1984

[54] ROTARY POSITIONING APPARATUS AND ASSOCIATED METHODS, SUCH AS FOR A CARBURETOR CHOKE VALVE

[75] Inventor: Hans Baumgartner, Viersen, Fed. Rep. of Germany

[73] Assignee: Pierburg GmbH & Co. KG., Neuss, Fed. Rep. of Germany

[21] Appl. No.: 317,765

[22] Filed: Nov. 3, 1981

[30] Foreign Application Priority Data

Oct. 29, 1980 [DE] Fed. Rep. of Germany ....... 3040636
Apr. 7, 1981 [DE] Fed. Rep. of Germany ....... 3113935

[51] Int. Cl.³ .................... H01R 39/00; H01F 7/08
[52] U.S. Cl. ................................ 335/229; 310/67 R; 310/71
[58] Field of Search ................ 335/229, 230, 272; 310/27, 49 R, 15, 80, 83, 75 D, 67 R, 71; 324/76, 154 PB, 155

[56] References Cited

U.S. PATENT DOCUMENTS

| | | | |
|---|---|---|---|
| 3,820,047 | 6/1974 | Juhnke | 335/229 |
| 3,976,965 | 8/1976 | Remus | 310/71 |
| 4,021,690 | 5/1977 | Burton | 310/67 R |
| 4,032,807 | 6/1977 | Richter | 310/67 R |
| 4,345,228 | 8/1982 | Idogaki et al. | 335/222 |

FOREIGN PATENT DOCUMENTS 124652 3/1899 Fed. Rep. of Germany ... 324/154 R

Primary Examiner—J. D. Miller
Assistant Examiner—D. Rebsch
Attorney, Agent, or Firm—Posnack, Roberts, Cohen & Spiecens

[57] ABSTRACT

Rotary positioning apparatus for a member movable through an angle of rotation of less than 360° comprising a rotor including windings thereon and a stator including a permanent magnet establishing a magnetic circuit providing magnetic flux through which the rotor is movable, the rotor and stator constituting a DC motor. The stator includes a stationary hollow shaft on which the rotor is rotatably supported by bearings. The rotor includes a neck adapted for being coupled with the member to be moved. A plurality of flexible current carrying wires extend through the hollow shaft and through slots provided in the neck to the windings for energization thereof. The hollow shaft has opposite open ends at one of which the wires enter the hollow shaft and at the other of which the wires exit from the shaft and extend through the slots to the windings such that the wires undergo twisting within the confines of the shaft as the rotor rotates with respect to the stator.

28 Claims, 4 Drawing Figures

ROTARY POSITIONING APPARATUS AND ASSOCIATED METHODS, SUCH AS FOR A CARBURETOR CHOKE VALVE

FIELD OF THE INVENTION

The present invention relates to rotary positioning apparatus, particularly for positioning a carburetor choke valve having an angle of rotation of less than 360°, and which comprises a permanent magnet and windings energized in analog or digital manner by means of an electric circuit. The invention also relates to associated methods for angularly positioning a member which can rotate through an angle less than 360°.

PRIOR ART

Rotary positioning apparatus is known which has a permanent magnet mounted on a rotatable shaft, the position of the magnet being determined by energization of windings which are arranged in the stator, whereby a magnetic field is produced which determines the position of the permanent magnet and thus the angle of rotation of the shaft. Since the mass of the permanent magnet rotor is relatively large, the adjustment time of the apparatus is adversely affected. Furthermore, the large rotational mass has a detrimental effect on sudden changes in position, since it produces substantial overshooting with respect to the desired position. Furthermore, when such rotary positioning apparatus is mounted on an internal combustion engine, the support for the rotary shaft is subjected to very high stresses since the inertial forces are large. This results in bearing wear which in turn means that during the life of the apparatus, the momentum of the rotary positioner in moving from rest changes so that, in addition to the bearing play, the positioning precision of the positioning member is also adversely affected.

SUMMARY OF THE INVENTION

An object of the present invention is to provide rotary positioning apparatus and associated methods which employ small moving masses, but produce sufficiently large positioning forces with high setting precision.

This and further objects are achieved, in accordance with the invention, by the provision of rotary positioning apparatus constructed as a conventional DC motor and particularly, a cup-type motor having a stationary permanent magnet and a low-inertia rotor provided with windings.

In accordance with one embodiment of the invention, a stationary hollow shaft is connected at one end to a housing of the rotary positioning apparatus and supports the permanent magnet, the feeding of current to the windings being effected by means of flexible wires.

In one arrangement of the invention, the magnet circuit comprises a permanent magnet within the winding drum on the hollow shaft and the magnetic circuit is closed via a housing of soft iron which surrounds the drum. This arrangement, however, has the disadvantage that only certain magnetic materials can be formed into a circular ring. This is generally done by casting. An AlNiCo alloy, for example, is suitable as the material for the ring. However, this material is particularly sensitive to magnetic changes which is of particular importance when the rotary positioning apparatus is used in automotive vehicles since, in view of the large variations of temperature within the engine compartment and the variations in the voltage of the electrical system of the vehicle, there is the danger of irreversible changes in the magnetic properties. This can take place, for instance, even with a material which experiences repeated change in the air gap upon the mounting of the rotary positioning apparatus. Materials which are suitable for the manufacture of magnets either can not be made as circular rings, as is true, for instance, of anisotropic ferrites since this material cannot be produced by casting but only by stamping and the magnetization can take place only in the direction in which the pressure is exerted or, as is true of isotropic ferrites, they have such poor magnetic properties (accumulation of low energy density) that the apparatus would be extremely large if this material were used.

Based on these considerations, the invention further contemplates a construction in which the permanent magnet is in the form of a hollow cylinder or annular segments and is associated with the housing while the magnet core is associated with the hollow shaft and is a soft-iron core.

By the use of the known principle of the DC motor constructed as a cup-type motor, the advantage is obtained that the masses which are moved are very small and the rotor thus has very low inertia. In the conventional motor, the feeding of the current is generally effected via commutators and this leads to inaccuracies, for relatively small positioning angles, due to hysteresis.

In further accordance with the invention, the current feed is effected by stranded wires which are permanently connected to the windings, the wires being conducted through the hollow shaft so that the entire length of the hollow shaft is available for torsional twisting of the wires. In this way, torsional stressing of the wires is slight and is far below the value permitted by the material.

In one advantageous embodiment of the invention, the rotor which is mounted on the hollow shaft, comprises a tubular power take-off neck in the region of the free end of the hollow shaft and has axial slots in a number equal to the number of wires, the wires being connected to soldering lugs, one end of each of which lies in a respective slot and is held therein by a nose of a hollow plug inserted into the power take-off neck, the noses engaging into the respective slots. In this way, there is obtained a release of the wire from tensile strain between the respective soldering lug and the hollow plug whereby the life of the solder connection is increased.

Furthermore, the wires are conducted centrally through the hollow plug, which is provided, at the end thereof opposite the projections, with curved guides for the wires, said wires being pressed against said guides by a rubber member which is held in the power take-off neck by means of a closure member. In this way, the path of the wires towards the soldering lugs which move with the rotor is effected in a manner free of kinks. Furthermore, the bore for the passage of the wires in the front end of the hollow plug is smaller in diameter than the inner bore of the hollow shaft. Thereby, the wires are not abraded at the bore in the plug.

Furthermore, in order to promote the life of the wires, the inner bore may taper at the free end of the hollow shaft. It may also be preferable to line or coat the inner bore with an anti-friction material at the free end of the hollow shaft.

In order to reduce play and thus increase the precision of adjustment of the rotary positioning apparatus, the mounting of the rotor on the stationary hollow shaft is effected by two anti-friction bearings which are urged towards each other in axial directon by means of a spring. This can be effected, on the one hand, in the manner that the spring bears at one end against the hollow shaft and at its other end against the inner race of a first bearing and the transmission of force proceeds via the outer races of the bearing and the rotor to the inner race of the second bearing.

The rotor is in the form of a drum which supports the windings and in order to eliminate consideration of the physical behavior of the rotor in the design of the spring, the rotor can be mounted in overhung fashion on the hollow shaft by arranging both anti-friction bearings in the power take-off neck.

In order to increase the precision of the setting further, the power take-off neck can be constructed as a mounting shaft for a setting member of the apparatus. In this way, any play present in a lever mechanism which might be provided is eliminated.

DETAILED DESCRIPTION

Figure 1:
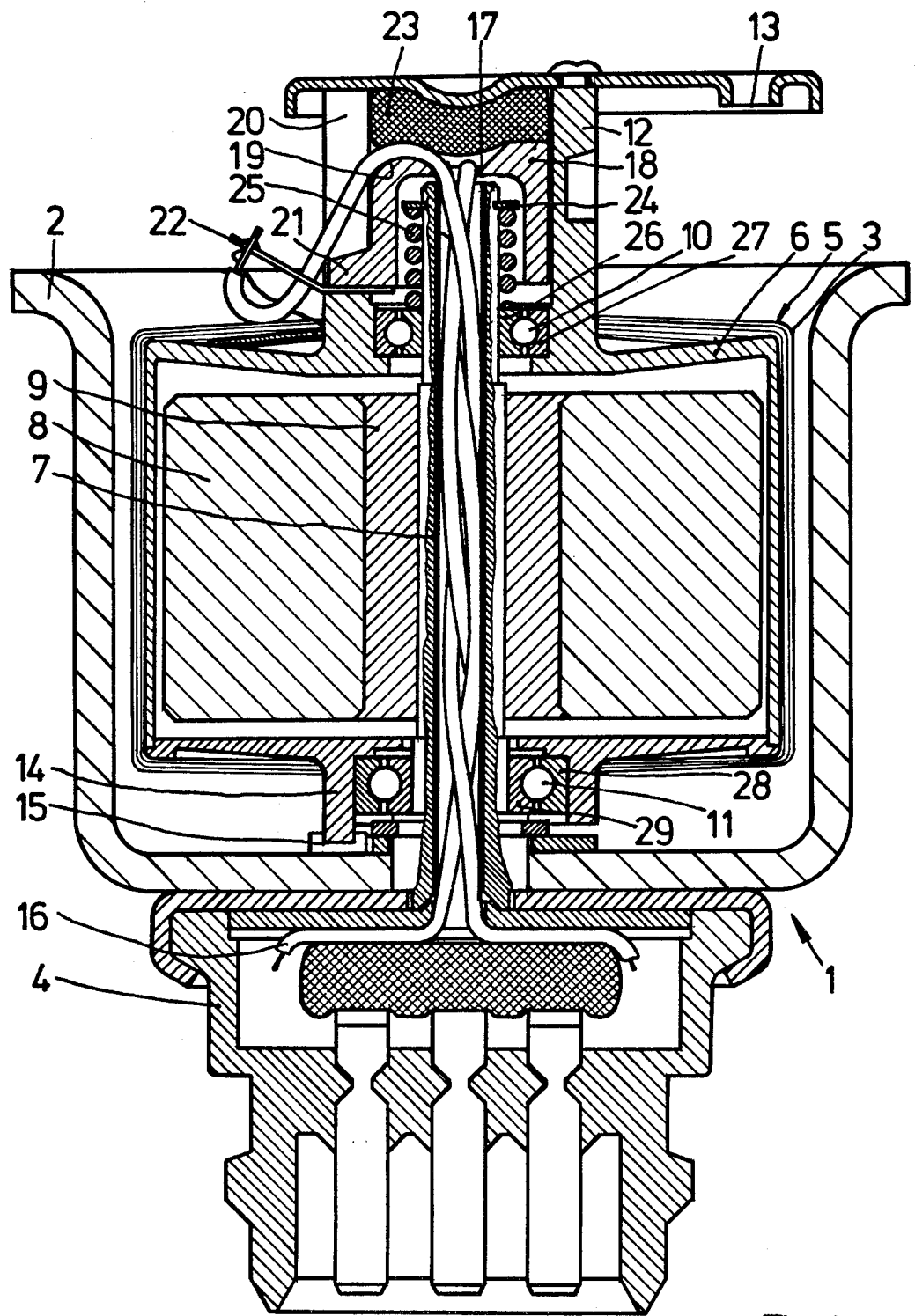
FIG. 1 is a longitudinal cross-sectional view taken through rotary positioning apparatus according to the invention, showing a first embodiment thereof.

Referring to FIG. 1 of the drawing, therein is seen rotary positioning apparatus 1 comprising a housing 2 which, depending on the use of the rotary positioning apparatus, can be secured, for example, on a carburetor (not shown) in order to actuate the choke valve thereof in accordance with predetermined operating parameters of the internal combustion engine. The apparatus comprises windings 3 which are connected to an electric circuit (not shown) which supplies the windings 3 with electrical voltage. The circuit can provide analog or digital voltage signals and does not form part of the invention, so that further description thereof can be dispensed with. The feed of current from the circuit is effected via an electrical plug 4 which is secured to the housing. Although the apparatus has been described as suitable for actuating the choke valve of a carburetor, this is to be understood as representing a particular use and other uses are also possible such as, for example, as an actuating member for a valve which controls the quantity of exhaust gas recycled to the carburetor.

The rotary positioning apparatus is based on the principle of a DC motor developed as cup-type motor including a rotor 5. This motor has the advantage that the rotor 5 is very low in inertia since it has the sole function of supporting the windings 3. In the embodiment shown in FIG. 1, the windings 3 are supported on a drum 6.

A stationary hollow shaft 7 is contained in the housing and when mounting the rotary positioning apparatus on the carburetor, the shaft 7 is immovably fixed with respect to the housing 2. The shaft 7 supports a stationary permanent magnet 8 which may be connected, for example, by means of a sleeve 9 to the hollow shaft 7. The drum 6 which supports the windings 3 and essentially constitutes the rotor 5 surrounds the permanent magnet 8 and is mounted on the hollow shaft 7 by two anti-friction bearings 10,11. The housing 2 is preferably made of soft iron, i.e. a magnetic material to form a magnetic circuit with permanent magnet 8 in which the rotor 5 travels in the air gap of the magnetic circuit. The drum 6 may be made of soft-iron material, thus providing the possibility of making the air gap very small since this material is of great intrinsic stability and there is no danger that the drum will be deformed under the stress exerted by the coil windings. Thereby, the flux density of the magnetic circuit is maximized. However, the magnetic circuit will still be operative if the drum is made from nonmagnetic material, such as plastic material.

In the region of the upper free end of shaft 7, the drum 6 is formed with a tubular power take-off neck 12 connected to a lever 13 which transmits the rotation of the rotor 5 to the carburetor choke valve by means of a lever system (not shown) which includes a restorative bias as is conventional. The rotation of the rotor 5 is less than 360°, which, in order to protect against external influences, can be obtained by a stop 14 on the drum 6 which cooperates with a stop 15 on the housing.

From the plug 4 a plurality of flexible stranded wires 16 pass through the hollow shaft 7 to the upper free end of the shaft and therefrom into a bore 17 in a hollow plug 18 fixed in neck 12. The bore 17 may be smaller than the inside diameter of the hollow shaft 7 to minimize abrasion of the wires. The hollow plug 18 is provided with curved guide surfaces 19 on which the wires pass and extend through slots 20 provided axially in the wall of the power take-off neck 12. Insulative soldering lugs 22 are inserted in the bottom of slots 20 and are held therein by means of projections or noses 21 on the hollow plug 18. The ends of wires 16 are soldered to respective lugs 22 and make connection thereat with windings 5. The wires 16 are forceably held against guide surfaces 19 of the hollow plug 18 by a resilient member 23, made of rubber or the like, which is held in the power take-off neck 12 by means of a closure member, in this case by the lever 13. The feed of the current to the windings is effected directly by flexible wires 16 in the manner described and therefore not via wiper elements as in the case of commutators. This has the advantage of freedom from hysteresis. Due to the fact that the wires are guided over the entire length of the hollow shaft 7, this length is available as a torsional twisting length upon the turning of the rotor 5. By pressing the wires between resilient member 23 and hollow plug 18, the portion of the wires between the resilient member and the soldering lugs remain free of strain and the life of the solder connections is thus unaffected by the angular movement of the rotor. The insulative soldering lugs 22 can be inserted into the bottom of the slots 20 and they can be suitably shaped at the insertion end, for instance, of H shape, so that they cannot slip out of the slot. The wires 16 can also be secured in position in the plug 4 by means of a resilient member.

In order to keep the positioning of the setting member i.e. lever 13 within the narrowest possible limits, play in the anti-friction bearings 10,11 is eliminated by urging the bearings towards each other by spring action. For this purpose, at the free end of the hollow shaft 7 there is a fixed snap ring 24 against which bears one end of a compression spring 25 whose other end bears against the inner race 26 of the anti-friction bearing 10. The transmission of the force of the spring takes place through the anti-friction members of bearing 10, the outer race 27 of bearing 10, the drum 6, the outer race 28 of bearing 11, the anti-friction members of bearing 11 and the inner race 29 of bearing 11. In this way, bearing play in the anti-friction bearings is eliminated. The principle of urging the bearings together can be reversed in that the spring can bear against the outer races and the transmission of force take place via the inner races and the hollow shaft, which is then provided with suitable shoulders. The spring 25 is dimensioned in relation to the resultant acceleration force of the rotor drum 6.

Figure 2:
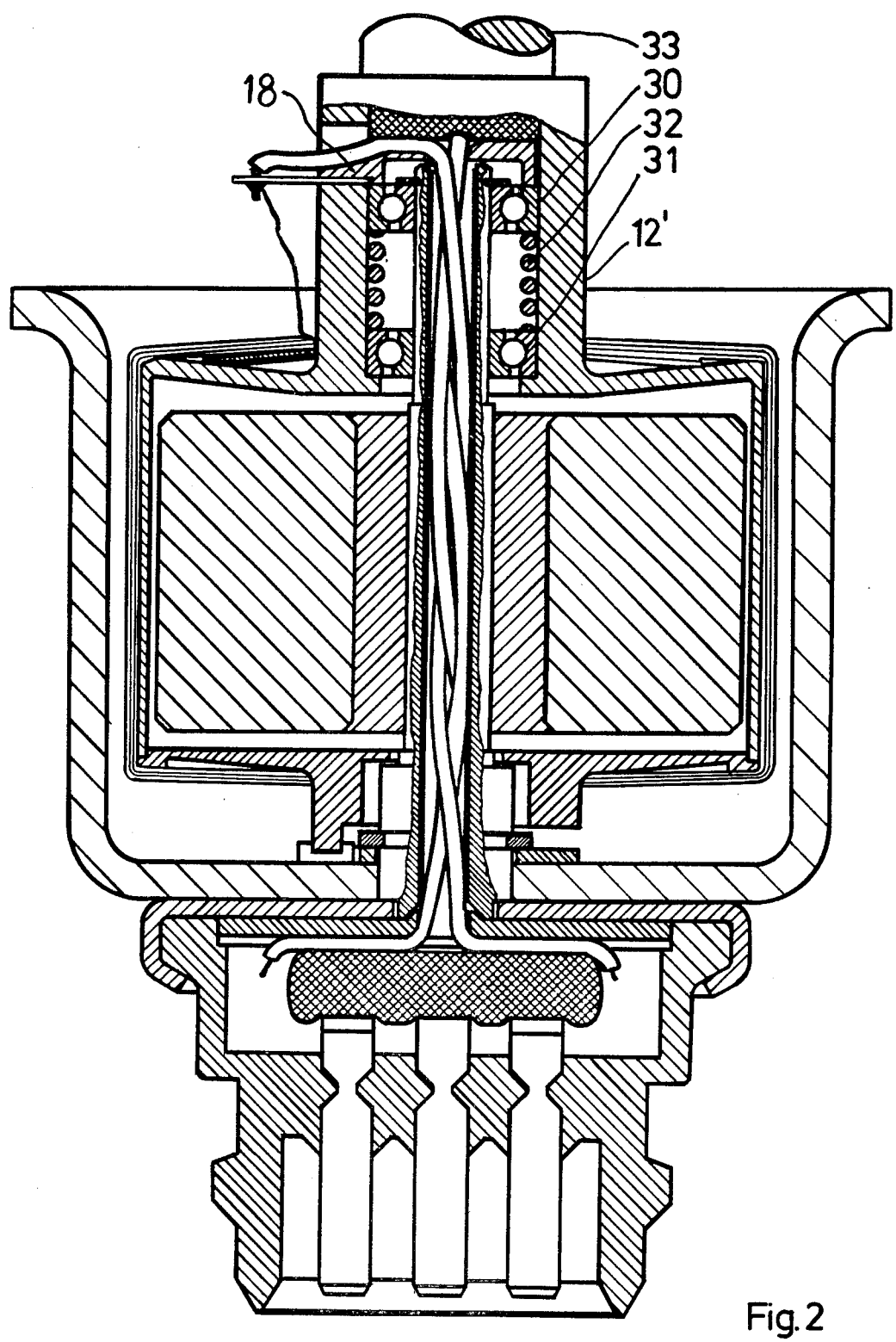
FIG. 2 is similar to FIG. 1 and shows a second embodiment of the invention.

In the embodiment shown in FIG. 2, the drum 6 is mounted at one end of the hollow shaft by two oblique shoulder bearings 30,31 in power take-off neck 12', the bearings being urged away from each other by a spring 32. When dimensioning this spring it is not necessary to take into consideration the physical behavior, for instance the elasticity, of the drum 6. In this embodiment, the setting member, for instance the choke valve, can be arranged directly on the power take-off neck 12' by a mounting shaft 33 integral with neck 12'. In this way the adjustment precision of the rotary positioning apparatus is further increased. The shoulder bearings 30,31 can be combined into a single structural unit and they are particularly advantageous since such a mounting provides a width of support which is greater than the distance between the rows of anti-friction members.

Figure 3:
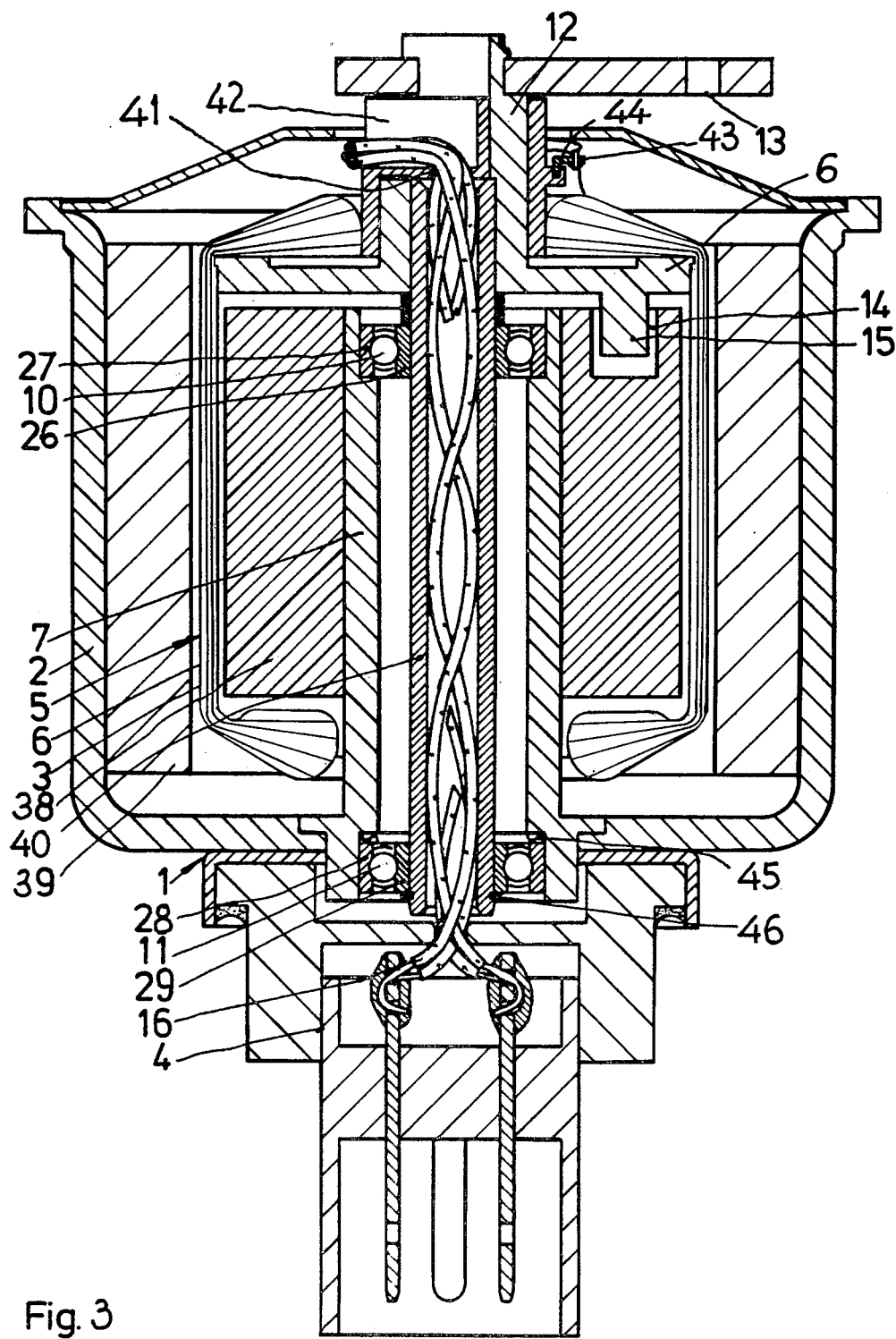
FIG. 3 is similar to FIG. 1 and shows a third embodiment of the invention.

In a modified embodiment as shown in FIG. 3, the same elements as in FIG. 1 are given the same numerals. Thus, in FIG. 3 it is seen that stationary shaft 7 is disposed within housing 2 and during mounting of the rotary positioning apparatus on the carburetor, the shaft 7 is fixed with respect to the housing. In FIG. 3, however, the shaft 7 supports stationary magnetic core 38 made of soft iron. The permanent magnet is designated by reference character 39 and is mounted on the inner surface of the wall housing 2 and is formed as a hollow cylinder or as cylindrical segments. Rotor 5 extends in the air gap between the permanent magnet 39 and the soft iron core 38.

In the embodiment shown in FIG. 3, the mounting of the rotor 5 is effected within the hollow shaft 7 in that the anti-friction bearings 10, 11 are arranged within the shaft 7 and bear against a hollow shaft 40 which is fixed in rotation to the drum 6 of the rotor 5.

The flexible stranded wires 16 pass through the hollow shaft 40 to the inner bore 41 of a plug 42 at the upper end of neck 12. The diameter of bore 41 may be smaller than the inside diameter of the hollow shaft 40. The wires 16 are connected to the windings of the rotor 5 at solder joints 43 formed at the ends of solder lugs 44 secured to drum 6. As in the previous embodiments, the feed of current to the windings is effected not by means of wiping contacts as in the case of commutators and brushes but by flexible wires 16. In FIG. 3 the wires are guided through the entire length of hollow rotatable shaft 40 and this length is available as a torsional twisting length for the wires upon turning of the rotor 5.

In FIG. 3, play in the anti-friction bearings 10,11 is eliminated by urging the bearings apart by a compression spring 45. In this regard, at the lower end of the hollow shaft 40 there is a snap ring 46 and the spring 45 acts in one direction to urge the inner race 29 thereagainst while acting in the other direction against inner race 26 of the bearing 10. The path of the force upon tensioning takes place via the anti-friction bearings and the outer race 27 resting on a shoulder of shaft 7, the shaft 7 itself and the outer race 28 resting on the shaft 7, the anti-friction members of the bearing 11 and the inner race 29 which rests against the snap ring on hollow shaft 40. In this way the bearing play of the anti-friction bearings is eliminated. This principle of the tensioning of the bearings can also be reversed, in that the spring can bear against the outer races and the path of force takes place via the inner races and the hollow shaft which is then provided with suitable shoulders. The spring 45 is dimensioned in accordance with the resultant force of acceleration of the rotor drum 6.

Figure 4:
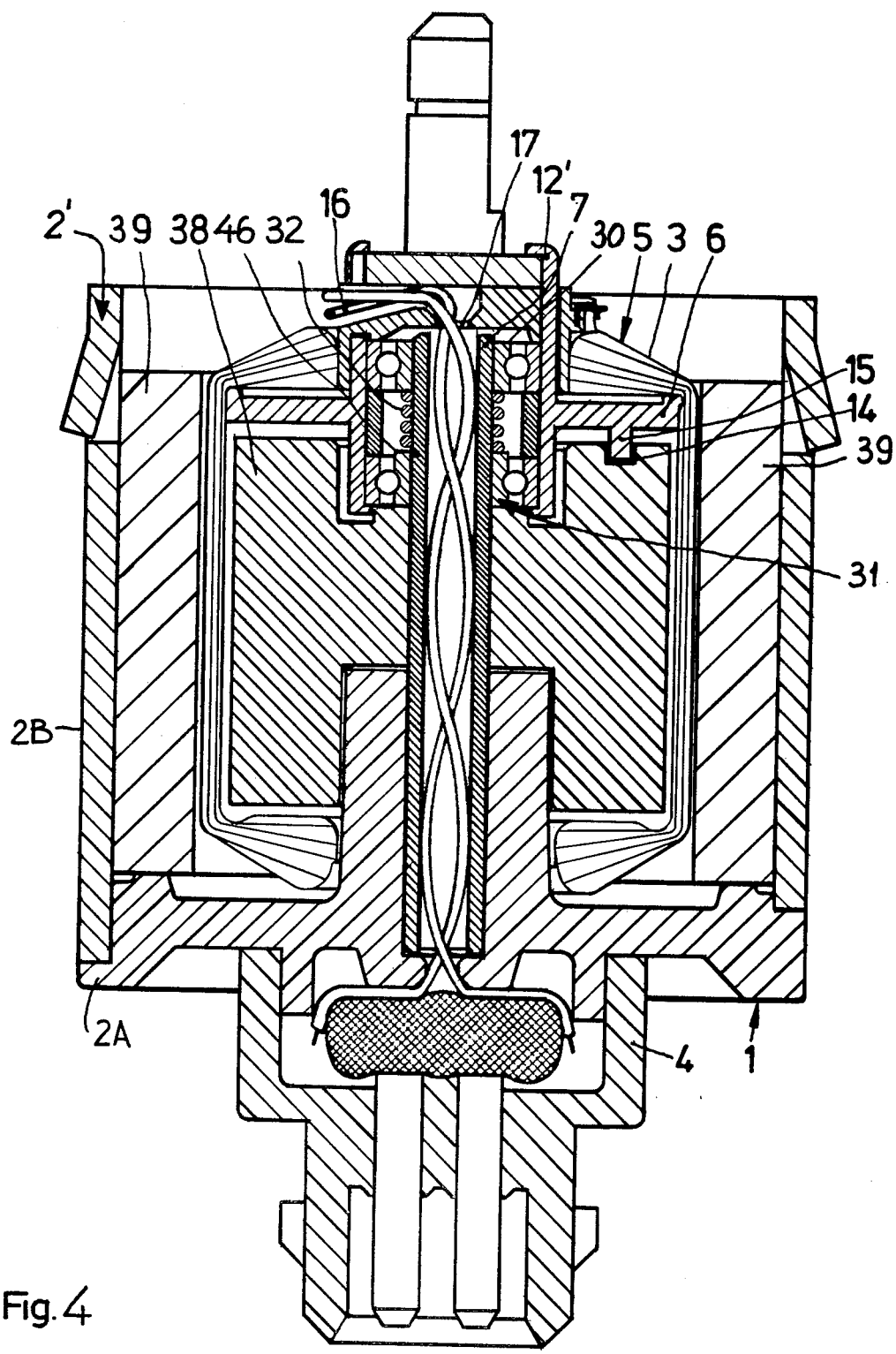
FIG. 4 is similar to FIG. 2 and shows a fourth embodiment of the invention.

The embodiment shown in FIG. 4 is similar to that in FIG. 3 in that the permanent magnets 39 are mounted on the inner wall of the housing and soft iron core 38 is fixed to shaft 7. The housing 2' in FIG. 4 is of different shape from that in FIG. 3 and comprises a base 2A and a rim 2B. The rotatable support of the drum on the shaft 7 is similar to that in FIG. 2 in that the drum 6 is mounted in suspension at one end on the hollow shaft 7 by oblique shoulder bearings 30,31 in the power take-off neck 12', the bearings being urged away from each other by means of spring 32. When dimensioning this spring it is not necessary to take into consideration the behavior of the material, for instance, the elasticity of the drum 6.

The rotary positioning apparatus is preferably assembled, as already mentioned, in the manner that the hollow shaft 7 is only fixed in the housing 2 after the housing 2 has been secured on the body of the carburetor and the angle of rotation of the position of the magnetic field to the zero position of the setting member to be actuated has been effected by turning the hollow shaft 7. This permits great precision of adjustment in mass production.

The windings 3 on the drum 6 are preferably formed by two coils. In the case of digital control at high frequency, the coils are energized alternately. The ratio of the times of action of the voltage on the two coils with respect to each other is varied. This so-called pulse-duty factor produces a resultant magnetic field which attempts to adjust itself in accordance with the position of the magnetic field of the permanent magnet. In this way, rotation of the rotor 5 is effected. After an angle of rotation as a result of the voltage signals, the magnetic fields are again in equilibrium with each other. If now, for instance in the case of a carburetor choke valve, a force is exerted on the setting member by the mass of air which flows through the carburetor, a restoring moment is produced due to the magnetic forces between rotor 5 and permanent magnet 8, in the case of the embodiments of FIGS. 1 and 2 and between rotor 5 and permanent magnet 39 in the case of the embodiments of FIGS. 3 and 4. The greater the deflection by external influences, as compared to the position of the resultant magnetic field, the greater the restoring moment which is established. In rotary positioning apparatus for actuating a setting member such as a carburetor choke valve with electronic action the resultant magnetic field is brought into a given position as a function of the temperature of the engine, its speed of rotation, or other operating parameters of the engine, this position characterizing an instantaneous state. The adapting of the vacuum prevailing downstream of the choke valve in the intake port of the carburetor to the variable mass flow of air of the internal combustion engine is effected in known manner in that the pressure difference produced at the choke valve brings about a moment of rotation by which the choke valve is opened further in opposition to the restoring moment of the rotary positioning apparatus. This naturally requires a construction of the choke valve with eccentric mounting. The vacuum produced downstream of the choke valve is therefore not determined solely by the position of the resultant magnetic field but, in addition, also by the moment-of-rotation characteristic of the rotary positioning apparatus, namely by the resultant restoring moment as a function of the deflection of the setting member with respect to the position of the resultant magnetic field.

For special uses it may be advantageous to provide the rotary positioner with only a single winding or to produce a unidirectional moment of rotation by means of two or more windings connected in parallel.

In this case, the positioning of the resultant magnetic field is dispensed with and only the force and/or moment equilibrium of the rotary positioner with the eccentrically mounted choke valve is used to determine the amount of vacuum.

What is claimed is:

1. Rotary positioning apparatus for a member movable through an angle of rotation of less than 360°, said apparatus comprising a rotor including windings thereon, a stator including a permanent magnet establishing a magnetic circuit providing magnetic flux through which said rotor is movable, said rotor and stator constituting a DC motor, said stator including a stationary hollow shaft, bearing means rotatably supporting said rotor on said hollow shaft, said rotor including a neck, means on said neck for coupling the neck with the member to be moved, means for energizing said windings on the rotor for producing rotation of the rotor, the latter means comprising a plurality of flexible current carrying wires extending through said hollow shaft and through slot means provided in said neck to said windings, said hollow shaft having opposite open ends at one of which said wires enter the hollow shaft and at the other of which said wires exit from said shaft and extend through said slot means to said windings, said wires undergoing twisting within said stationary shaft as said rotor rotates with respect to said stator.

2. Rotary positioning apparatus as claimed in claim 1 wherein said slot means comprises slots in said neck extending axially of said neck and present in a number equal to the number of wires, said apparatus further comprising an insulative soldering lug for each wire establishing connection between said wire and the rotor windings, each lug including an end portion engaged in a respective said slot corresponding to the associated wire, and a hollow plug in said neck holding the end portions of the lugs in the slots.

3. Rotary positioning apparatus as claimed in claim 2 wherein said plug includes noses engaged in said slots and holding the end portions of the lugs against ends of the slots.

4. Rotary positioning apparatus as claimed in claim 3 further comprising clamping means holding said wires in fixed relation with said rotor where they exit from said other end of said hollow shaft.

5. Rotary positioning apparatus as claimed in claim 4 wherein said plug has curved guide surfaces on which said wires respectively pass, said clamping means comprising a member of resilient material secured in said neck and pressing said wires against said guide surfaces.

6. Rotary positioning apparatus as claimed in claim 5 wherein said plug has a bore through which said wires extend to said guide surfaces, said bore in said plug having a smaller diameter than the bore in said hollow shaft.

7. Rotary positioning apparatus as claimed in claim 6 wherein the bore in the plug and the bore in the hollow shaft are substantially coaxial.

8. Rotary positioning apparatus as claimed in claim 7 wherein the bore in said plug is conically tapered.

9. Rotary positioning apparatus as claimed in claim 6 or 8 wherein said bore in said shaft includes an anti-friction lining at said other end of said shaft.

10. Rotary positioning apparatus as claimed in claim 5 comprising a closure member securing said member of resilient material in said neck, said closure member being operatively coupled to the member which is to be moved by the rotary positioning apparatus.

11. Rotary positioning apparatus as claimed in claim 1 comprising stop means on said rotor and stator for limiting the angular movement of the rotor to less than 360°.

12. Rotary positioning apparatus as claimed in claim 1 wherein said bearing means comprises first and second bearings axially spaced on said hollow shaft rotatably supporting said rotor, and spring means for applying elastic force axially of said bearings.

13. Rotary positioning apparatus as claimed in claim 12 wherein each bearing includes an inner race, an outer race, and bearing members between the inner and outer races, said spring means having one end acting on said shaft and an opposite end acting on the inner race of the first bearing, the outer races of the first and second bearings abutting against said rotor, said inner race of said second bearing being acted on by said shaft such that the resilient action of the spring is transmitted through the outer races of the bearings and the rotor to the inner race of the second bearing.

14. Rotary positioning apparatus as claimed in claim 12 wherein said first and second bearings are disposed in said neck and said rotor is suspended on said shaft.

15. Rotary positioning apparatus as claimed in claim 14 wherein said neck includes a support shaft for operating the member which is movable by the rotary positioning apparatus.

16. Rotary positioning apparatus as claimed in claim 1 wherein said rotor includes a drum on which said windings are wound.

17. Rotary positioning apparatus as claimed in claim 16 wherein said permanent magnet is on said shaft, said apparatus further comprising a housing of magnetizable material surrounding said rotor and defining a flux gap with said permanent magnet in which said rotor travels.

18. Rotary positioning apparatus as claimed in claim 1 wherein said stator includes a core of magnetizable material on said shaft, said permanent magnet surrounding said rotor.

19. Rotary positioning apparatus as claimed in claim 18 wherein said permanent magnet comprises a hollow cylinder.

20. Rotary positioning apparatus as claimed in claim 18 wherein said permanent magnet comprises annular segments.

21. Rotary positioning apparatus as claimed in claim 18 wherein said magnetizable material of said core is soft iron.

22. Rotary positioning apparatus as claimed in claim 18 comprising a housing surrounding said rotor, said permanent magnet being on said housing.

23. Rotary positioning apparatus as claimed in claim 22 wherein said permanent magnet and core define a flux gap in which said rotor travels, said rotor including a drum of magnetizable material on which said windings are wound.

24. Rotary positioning apparatus as claimed in claim 22 wherein said bearing means comprises first and second bearings axially spaced on said hollow shaft rotatably supporting said rotor, and spring means for applying elastic force axially of said bearings.

25. Rotary positioning apparatus as claimed in claim 24 wherein said first and second bearings are disposed in said neck and said rotor is suspended on said shaft.

26. Rotary positioning apparatus as claimed in claim 22 wherein said neck includes a support shaft for operating the member which is movable by the rotary positioning apparatus.

27. Rotary positioning apparatus as claimed in claim 22 further comprising a second hollow shaft fixed to said rotor and extending into the first said hollow shaft, said first and second bearings being between said first and second hollow shafts.

28. Rotary positioning apparatus as claimed in claim 27 wherein said wires extend within said second shaft.

* * * * *